No. 688,555. Patented Dec. 10, 1901.
E. T. SPECHT.
BUCKLE.
(Application filed July 19, 1901.)

(No Model.)

Witnesses:
R. J. Jacker,
R. K. Gustafson.

Inventor:
Eugene T. Specht,
By Coburn, McRoberts & McElroy,
Attys.

UNITED STATES PATENT OFFICE.

EUGENE T. SPECHT, OF CHICAGO, ILLINOIS, ASSIGNOR OF ONE-HALF TO ERNEST A. EASTMANN, OF CHICAGO, ILLINOIS.

BUCKLE.

SPECIFICATION forming part of Letters Patent No. 688,555, dated December 10, 1901.

Application filed July 19, 1901. Serial No. 68,875. (No model.)

*To all whom it may concern:*

Be it known that I, EUGENE T. SPECHT, a citizen of the United States, residing at Chicago, in the county of Cook and State of Illinois, have invented certain new and useful Improvements in Clasps and Buckles, of which the following is a specification.

My invention is concerned with clasps and buckles such as are used in suspenders, belts, hose-supporters, garters, &c., and is designed to produce a device of the class described that can be quickly and accurately attached, preferably without sewing, to the end of a belt or suspenders, so as to produce thereon a loop of any desired length and preferably in any desired position and that can be quickly and readily adjusted and cast off.

Figure 1:
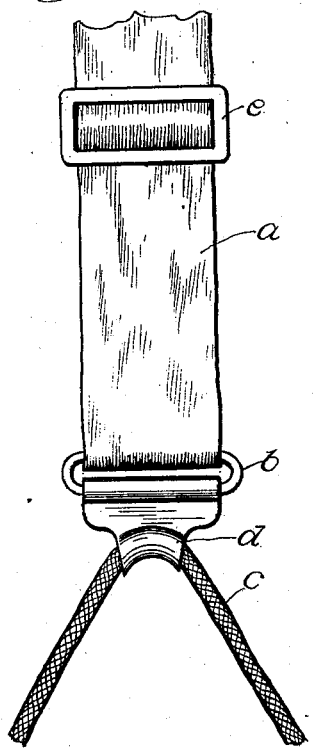
Figure 2:
Figure 3:
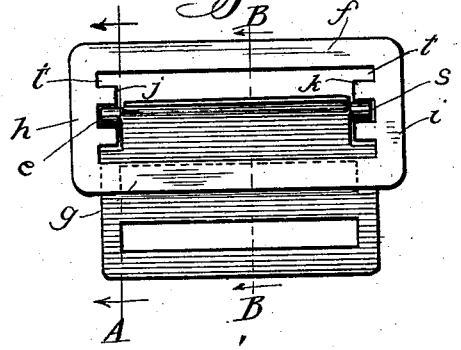
Figure 4:
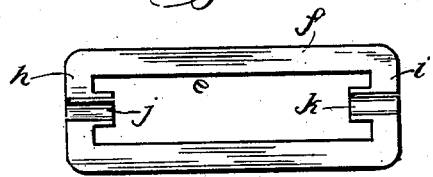
Figure 5:
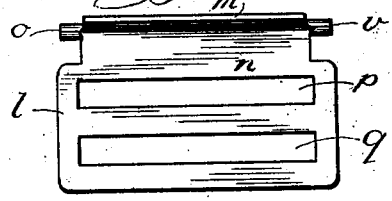
Figure 6:
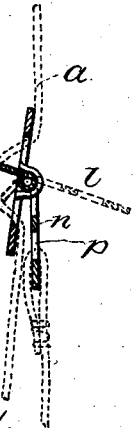
Figure 7:

Referring to the accompanying sheet of drawings, in which I have shown my invention as applied to a suspender and in which the same reference characters are used to designate identical parts in all the views, Figure 1 is a front elevation of a suspender-end having my invention employed thereon. Fig. 2 is a side elevation of the same. Fig. 3 is a front elevation, on a larger scale, showing the two members in operative position, but detached from the strap. Fig. 4 is a front elevation of the front member, showing a slightly-modified construction. Fig. 5 is a similar view of the rear member. Fig. 6 is a sectional view on the line A A of Fig. 3, but showing a slightly-different construction of the rear member; and Fig. 7 is a similar section on the line B B of Fig. 3, but showing still another form of the rear member.

As illustrated in the drawings, the purpose to which my invention is applied is to form a loop on the end of the strap $a$ to receive the connection $b$, which has the tab-cord $c$ passed through the bearing-sleeve $d$ thereon. The front member $e$ consists of the open rectangular plate made up of the top and bottom pieces $f$ and $g$ and the side pieces $h$ and $i$, having the concave bearing-ears $j$ and $k$, respectively, projecting therefrom. The rear member $l$ consists of the substantially horizontal portion $m$, projecting forwardly and upwardly a short distance, and the vertical portion $n$, extending downward, the portion $m$ and the upper corners of the portion $n$ being preferably cut away to permit of the pintles $o$, which coöperate with the ears $j$ and $k$, being formed at the angles by stamping a portion of the cut-away metal into the cylindrical shape shown. In the preferred form (shown in Figs. 2, 3, and 5) the vertical portion $n$ is formed with the two elongated parallel slots $p$ and $q$ therein. In the form shown in Fig. 6 the portion below the top of the slot $q$ is cut away, leaving only the slot $p$, through which the end of the strap $a$ is passed and secured by sewing, as indicated in dotted lines. In the form shown in Fig. 7 the portion $n$ has a clamping member $r$—such, for instance, as is shown in my Patent No. 661,676, dated November 13, 1900, by which the end of the strap $a$ is clamped thereto. To form the concave bearing-ears $j$ and $k$ as the front member $e$ is stamped out in the form shown in Fig. 3, the plate is cut through at $s$, and enough metal is left on either side beyond the cut, as at $t$, so that it will have sufficient strength to support the concave portion of the ear. In the preferred form, (shown in Fig. 4,) where the concave portion extends across the side pieces $h$ and $i$ the additional metal at $t$ is not necessary, as it is not cut through at $s$.

The operation of the invention is as follows: The rear member $l$ having been secured to the strap $a$ by clamping it, as in Fig. 7, or by sewing it, as in Fig. 6, or by passing it through the recesses $p$ and $q$ and doubling it back, as in Fig. 2, the front member $e$ is secured upon the strap in the proper position to form the desired length of loop by passing the strap through the central recess and around the ears $j$ and $k$, after which the pintles $o$ can be readily engaged with the ears $j$ and $k$ by inclining the member $l$ slightly. With the parts thus assembled, as seen in Figs 2, 6, and 7, it will be apparent that they will be securely held in place against any accidental displacement, but that they can be readily disengaged when desired, they being so readily disengaged and engaged that they can be used as a cast-off to release the tab from the strap. By turning the rear member $l$ at right angles, as shown in dotted lines in Fig. 6, the front member $e$ can be freely slid up and down to change the adjustment. With the specific form shown in Figs. 2, 3, and 5 the exact length and position of the loop that may be desired can be secured without cutting off the ends of the strap, whereas in the form shown in Fig. 7 the strap must be cut off at the right length, while in the form shown in Fig. 6 it must also be sewed in place.

While I have herein shown and described my invention as embodied in the form which I at present consider best adapted to carry out its purposes, it will be understood that it is capable of modifications and that I do not desire to be limited in the interpretation of the following claims except as may be necessitated by the state of the prior art.

Having thus described my invention, what I claim as new, and desire to secure by Letters Patent of the United States, is—

1. In a device of the class described, the combination with the strap, of the front member having concave bearing-ears and also having the elongated recess in the center thereof into which the concave bearing-ears project a short distance so that it can be readily fitted over the strap, and the rear member having the pintles coöperating with the bearing-ears and provided with the parallel slots $p$ and $q$ therein by which it can be secured to said strap at any distance from the end thereof.

2. In a device of the class described, the combination with the strap, of the front member having concave bearing-ears and also having the elongated recess in the center thereof, into which the concave bearing-ears project a short distance so that it can be readily fitted over the strap, and the rear member having the substantially horizontal portion coöperating with said strap in the recess of the front member and the vertical portion to which the end of the strap is adapted to be secured and the pintles coöperating with the bearing-ears.

3. In a device of the class described, the combination with the strap, of the front member having concave bearing-ears and also having the elongated recess in the center thereof into which the concave bearing-ears project a short distance so that it can be readily fitted over the strap, and the rear member consisting of the substantially horizontal portion $m$ coöperating with the elongated recess, the substantially vertical portion having the parallel slots $p$ and $q$ therein for the purpose described, and the pintles $o$ located between said portions and coöperating with the bearing-ears; all coöperating substantially as and for the purpose described.

In witness whereof I have hereunto set my hand this 13th day of July, 1901.

EUGENE T. SPECHT.

In presence of—
JOHN H. McELROY,
R. K. GUSTAFSON.